US005793885A

United States Patent [19]

Kasson

[11] Patent Number: 5,793,885
[45] Date of Patent: Aug. 11, 1998

[54] COMPUTATIONALLY EFFICIENT LOW-ARTIFACT SYSTEM FOR SPATIALLY FILTERING DIGITAL COLOR IMAGES

[75] Inventor: James Matthews Kasson, Menlo Park, Calif.

[73] Assignee: International Business Machines Corporation, Armonk, N.Y.

[21] Appl. No.: 898,748

[22] Filed: Jul. 23, 1997

Related U.S. Application Data

[63] Continuation of Ser. No. 381,255, Jan. 31, 1995, abandoned.

[51] Int. Cl.$^6$ .................................................. G06K 9/00
[52] U.S. Cl. ........................................ 382/167; 382/263
[58] Field of Search ............................ 382/167, 263, 382/162; 358/518, 520, 515

[56] References Cited

U.S. PATENT DOCUMENTS

| | | | |
|---|---|---|---|
| 4,752,821 | 6/1988 | Poetsch | 348/234 |
| 4,876,591 | 10/1989 | Muramatsu | 348/236 |
| 4,951,129 | 8/1990 | Lang | 348/610 |
| 4,970,584 | 11/1990 | Sato et al. | 358/518 |
| 5,012,333 | 4/1991 | Lee et al. | 358/520 |
| 5,032,901 | 7/1991 | Vlahos | 348/587 |
| 5,130,935 | 7/1992 | Takiguchi | 364/526 |
| 5,170,152 | 12/1992 | Taylor | 345/155 |
| 5,237,402 | 8/1993 | Deshon et al. | 358/520 |
| 5,278,678 | 1/1994 | Harrington | 358/518 |
| 5,283,670 | 2/1994 | Capitant et al. | 358/530 |
| 5,303,071 | 4/1994 | Kakimura | 358/519 |
| 5,307,159 | 4/1994 | Hieda | 348/235 |
| 5,315,416 | 5/1994 | Taniuchi et al. | 358/537 |
| 5,319,451 | 6/1994 | Sasaki et al. | 348/273 |
| 5,329,362 | 7/1994 | Takaiwa | 348/228 |
| 5,502,458 | 3/1996 | Braudaway et al. | 345/153 |
| 5,508,812 | 4/1996 | Stevenson et al. | 348/552 |
| 5,515,112 | 5/1996 | Penney | 348/630 |
| 5,526,051 | 6/1996 | Gove et al. | 348/388 |
| 5,528,339 | 6/1996 | Buhr et al. | 355/32 |
| 5,548,330 | 8/1996 | Hieda et al. | 348/234 |
| 5,557,340 | 9/1996 | Millward | 348/630 |
| 5,572,236 | 11/1996 | Feig et al. | 345/154 |

OTHER PUBLICATIONS

J.M. Kasson and Wil Plouffe, "An Analysis of Selected Computer Color Spaces", ACM Transactions on Graphics, vol. 11, No. 4, Oct. 1992, pp. 398–405.
SMPTE Standard, SMPTE 240M–1988, pp. 1–5, 1988.
CCIR Report 624–4, pp. 1–33, 1990.
Adobe Photoshop User Guide, 1993, pp. 138–139.

Primary Examiner—Yon J. Couso
Attorney, Agent, or Firm—Baker Maxham Jester & Meador

[57] ABSTRACT

A computationally efficient system spatially filters a digital input image to sharpen the image. A process is disclosed to spatially filter pixels of an RGB image by applying a high pass filter to the image. First, signals representative of luminance are extracted from the input image. Then, the extracted luminance signals are filtered. Quotient signals are then developed, representing the ratio between each filtered luminance signal and the corresponding original luminance signal. Quotient signals are multiplied by the corresponding pixels of each plane of the original image to provide an output image. The invention may also be embodied by an image editor to implement the spatial filtering process of the invention, where the image editor includes stored programming instructions executed by a processor, discrete circuit components, an ASIC, or another suitable hardware device.

72 Claims, 9 Drawing Sheets

COMPUTATIONALLY EFFICIENT LOW-ARTIFACT SYSTEM FOR SPATIALLY FILTERING DIGITAL COLOR IMAGES

This application is a continuation of application Ser. No. 08/381,255, filed Jan. 31, 1995, now abandoned.

BACKGROUND OF THE INVENTION

1. Field of the Invention

The present invention relates to spatial filtering of images that are represented by electronic signals compatible with a computer. More particularly, the invention concerns a computationally efficient system for spatially filtering an RGB input image to "sharpen" the image. The present invention enhances high frequency components of the image by extracting a luminance signal, processing the luminance signal, then modifying the image in accordance with the processed luminance signal.

2. Description of the Related Art

Colors in CRT-Based Image Systems

The primary colors of a color cathode ray tube ("CRT") result from the visible emissions of three different mixtures of phosphors, each of which can be independently excited by an electron beam. When an observer views the CRT from a proper distance, the observer's eyes cannot resolve the individual phosphor dots. Thus, the contributions of each of the three phosphors add together to create a combined spectrum, which the observer perceives as a single color. The intensity of light emitted from each phosphor is linearly related to the electron beam current of the CRT. Specifically, the light intensity is largely proportional to the electron beam current raised to the power of an exponent called "gamma". See, e.g., Foley & Van Dam, "Fundamentals of Interactive Computer Graphics," PC 1982, pp. 594–597. Gamma is the exponent to which an electron beam current must be raised to cause a phosphor on a computer monitor to emit light of a desired intensity. Accordingly, a CRT with a constant gamma for all three phosphors, viewed in a dark room, produces a color that can be described, in the color space of its primaries, according to Equation 1:

$$\begin{bmatrix} R \\ G \\ B \end{bmatrix} \propto \begin{bmatrix} (I_R)^\gamma \\ (I_G)^\gamma \\ (I_B)^\gamma \end{bmatrix} \quad [1]$$

The level of current in an electron beam of a computer monitor is usually linearly related to the values stored in the display buffer. With the RGB values scaled into the range [0,1], if we wish to produce a color with tri-stimulus values in the color space of the monitor's primaries (R,G,B), then the beam current should be $(R^{1/\gamma}, G^{1/\gamma}, B^{1/\gamma})$. This nonlinear RGB encoding is called "gamma-correcting". An image that has been gamma-corrected for a monitor with a gamma of 2.2 is referred to as itself having a gamma of 2.2, even though the corrective operation actually involves raising each component of each pixel in the image to the power of 1/2.2.

Spatial Filtering in an RGB Color Space

"Spatial filtering" encompasses various techniques concerned with processing multidimensional signals. In the field of computer graphics, image editors are used to carry out spatial filtering by changing the characteristics of a digital color image stored in computer memory. In this regard, an image editor may embody an executable process in a computer system or an integrated circuit that processes images displayed on a computer monitor.

RGB is one of the most common color spaces in digital image processing. In many graphics systems, RGB images are divided into three color planes: red, blue, and green. Image editors typically process RGB images by operating on a buffered array of pixels representing the image. As shown in FIG. 1, each pixel 100 includes three eight bit digital values 104–106 representing the intensity of the corresponding red, green, and blue pixel components, respectively. The signals corresponding to the pixels are stored in an image buffer 102 which is partitioned into three two-dimensional subparts 110–112 called "color planes". Each color plane 110–112 stores respective red, green, or blue components of all pixels in the array of pixels that forms an image.

The data storage arrangement of FIG. 1 is used by various image editors to perform spatial filtering. A primary goal of many spatial filters is the enhancement of certain image "contrasts" to achieve a "sharpening" effect. As shown by the flow diagram of FIG. 2, one example of such a spatial filter operates by subjecting each color plane of an RGB image to the same type of processing. This processing may involve, for example, convolution with a filter kernel. Such filtering is commonly used, for example, to sharpen or blur photographic or photo-realistic images, and to produce aesthetically pleasing effects. Table 1 (below) contains pseudocode corresponding to the technique of FIG. 2.

TABLE 1

| |
|---|
| rFiltered = convolve r kernel |
| gFiltered = convolve g kernel |
| bFiltered = convolve b kernel |

Although this technique provides some benefits, its usefulness is limited in certain applications. For instance, in some circumstances this technique produces objectionable artifacts, such as color "fringing" at object boundaries. Additionally, this technique changes the chromaticity of the image, depending on the amount of energy in each color plane that is within the filter's stopband. Since most sharpening applications aim to restrict changes to luminance, this effect is often undesirable.

FIG. 3 illustrates a flow diagram corresponding to a different type of sharpening filter, which processes one color plane to develop corrections for that plane, and subsequently adds the corrections for that plane to the other two planes. With this type of spatial filter, the first color plane may be processed by convolving the image of that plane with a filter kernel, as shown in FIG. 3.

Although the technique of FIG. 3 may be advantageous in some applications, it can alter the image in a manner that is undesirable for some users. Particularly, this technique changes the chromaticity of the image, depending upon the relative values of each color in each pixel location. The chief goal of most sharpening filters is to sharpen an image by changing the luminance of the image's pixels, while avoiding any changes to the image's chrominance. In a general sense, luminance refers to the brightness of a color, while chrominance concerns the color of an image regardless of its darkness or brightness. Therefore, since the approach of FIG. 3 changes an image's chrominance, it may not be appropriate for some applications.

Filtering in a Luminance-Chrominance Color Space

Scientists have developed a variety of other color representations that endeavor to separately consider the image's chrominance and luminance. At first glance, the "YIQ" color space appears to have some benefits for use in spatial filters. The YIQ color space is a pseudo luminancechrominance color space, where Y represents an approximation to the luminance of a pixel. Using the YIQ color space is convenient for RGB-based images, since Y can be obtained from the RGB components of a pixel by combining them in predetermined proportions. However, the I and Q components encode other characteristics than chromaticity. Thus, operations in the YIQ color space change the chromaticity of the adjusted RGB intensity values, and the YIQ color space is not appropriate for most spatial filters.

To overcome the problems of YIQ, some scientists have considered the true luminance-chrominance color space "CIELAB". Although this approach may benefit some users, it comes with a high computation cost due to the complicated transformations between RGB and CIELAB. For another example of a spatial filter that operates in the chrominanceluminance color space, see Govrin, "Sharpening of Scanned Originals Using the Luminance, Hue and Saturation Coordinate System," *Color Hard Copy and Graphic Arts III*, SPIE vol. 2171, pp. 332–340. The Govrin approach, depicted in FIG. 4, first converts an input image to a color space that separates luminance from chrominance. Then, Govrin filters only the luminance component. In particular, Govrin converts an RGB image to a "CMYK" image, and then converts the CMYK image to an "LHS" image. Govrin then sharpens the LHS image, and then converts the sharpened LHS image back to CMYK.

Govrin's approach eliminates many of the color artifacts produced by the RGB processing methods. Nonetheless, Govrin's approach encounters limitations in certain applications. As discussed above, Govrin's approach involves three transformations: first to the CMYK color space, then to LHS, and then back to CMYK color space. Govrin may even require a fourth transformation for applications requiring conversion of the image back to the RGB color space. These transformations incur a significant computation cost, which may be manifested by excessive processing time. For applications in which processing time is critical, then, Govrin's technique might not be satisfactory.

SUMMARY OF THE INVENTION

The present invention concerns a computationally efficient system for spatially filtering a digital input image to sharpen the image. In one embodiment, the present invention comprises a process for spatially filtering pixels of an RGB input image by applying a high pass filter to the image. First, signals representative of luminance are extracted, then the image is filtered based upon the extracted luminance signals. Filtering may be achieved, for example, by applying a convolution filter to the luminance signals in accordance with an appropriate filter kernel. Then, the filtered signals are divided by the corresponding original luminance signals to yield quotient signals. Finally, the quotient signals are multiplied by the components of the input image to provide a filtered output image.

The present invention may also be embodied in an apparatus comprising an image editor configured to implement the spatial filtering process of the invention. The image editor of the invention may comprise various processors and RAM modules of a digital computer, circuitry of an ASIC, or components of another suitable hardware system.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS

Structure

Figure 5:
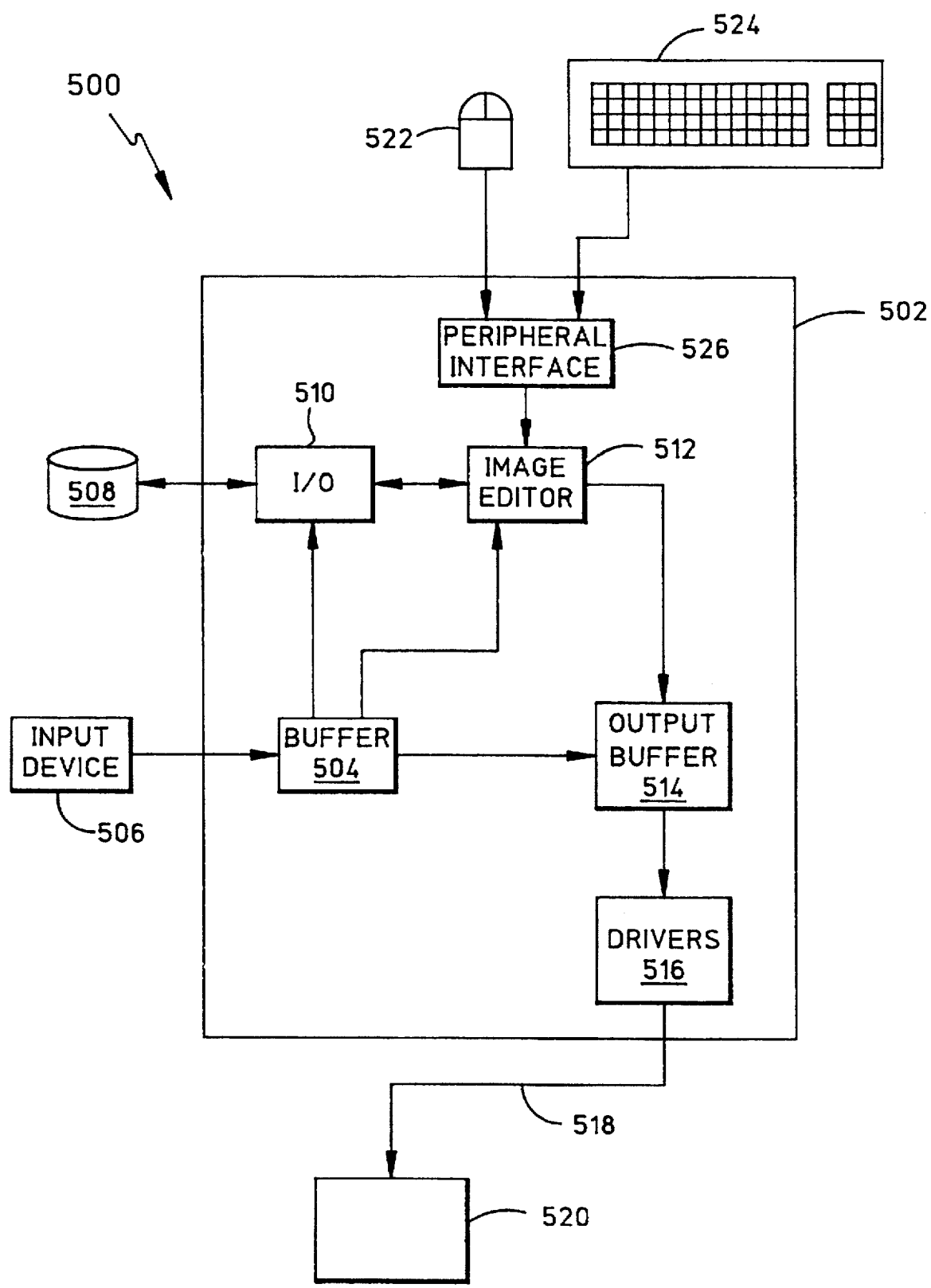
FIG. 5 is a diagram of the hardware components and interconnections of an illustrative construction of an image editing system 500 in accordance with the present invention.

In an illustrative embodiment, the present invention may be practiced in the physical context of the hardware components and interconnections of FIG. 5. Specifically, FIG. 5 illustrates an image editing system 500 that includes a computer 502. The computer 502 preferably comprises a general-purpose personal computer such as an IBM brand RS/6000 model computer. Although not shown, the structure of the computer 502 includes one or more processors, random access memory ("RAM"), direct access memory, and other suitable components.

Figure 1:
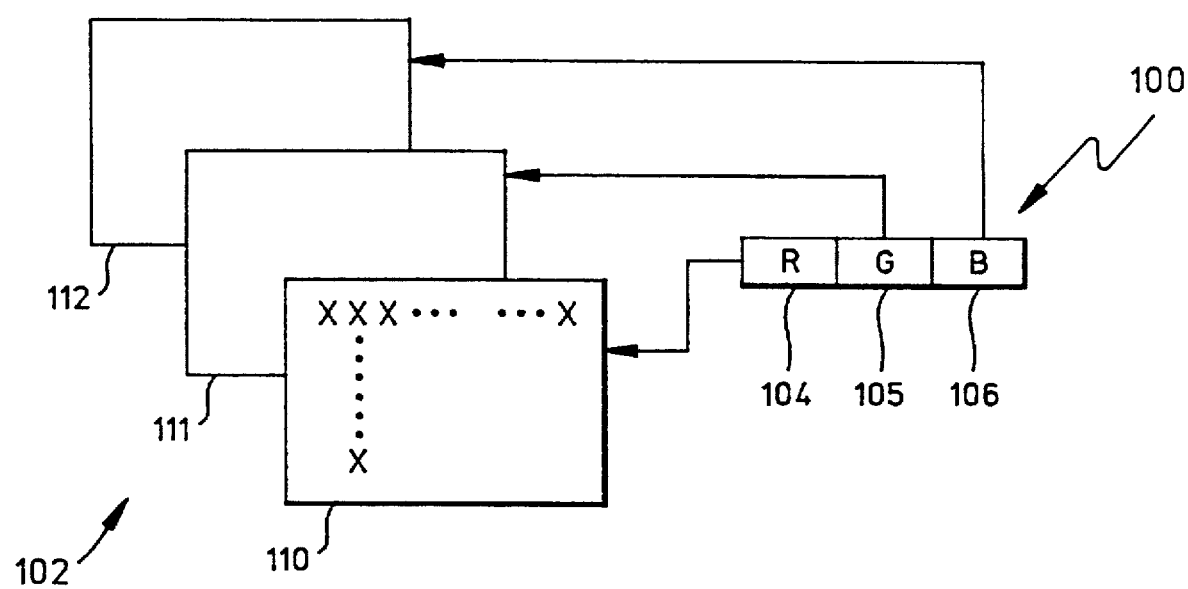
FIG. 1 is a diagram of a known structure of image buffer 100.

The computer 502 includes an input image buffer 504 to store a multiplicity of pixels representing a digital color image. In an illustrative embodiment, the buffer 504 may utilize a configuration such as the image buffer 102. The buffer 504 receives its contents from an input device 506, which may comprise a variety of different hardware components. For example, the input device 506 may comprise a video camera, a digital scanner, or another suitable device to provide a digital color image for processing. In an illustrative embodiment, the input device 506 provides an output comprising a sequence of digital data packets, each packet including three eight-bit numbers representing the magnitudes of the red, green, and blue components of a pixel. In an illustrative embodiment, the buffer 504 assembles the sequence of digital data packets into three color planes such as shown in FIG. 1. Alternatively, the input data may originate from a direct access storage device ("DASD") 508, from which stored images are retrieved using an input-output ("I/O") channel 510.

Figure 6:
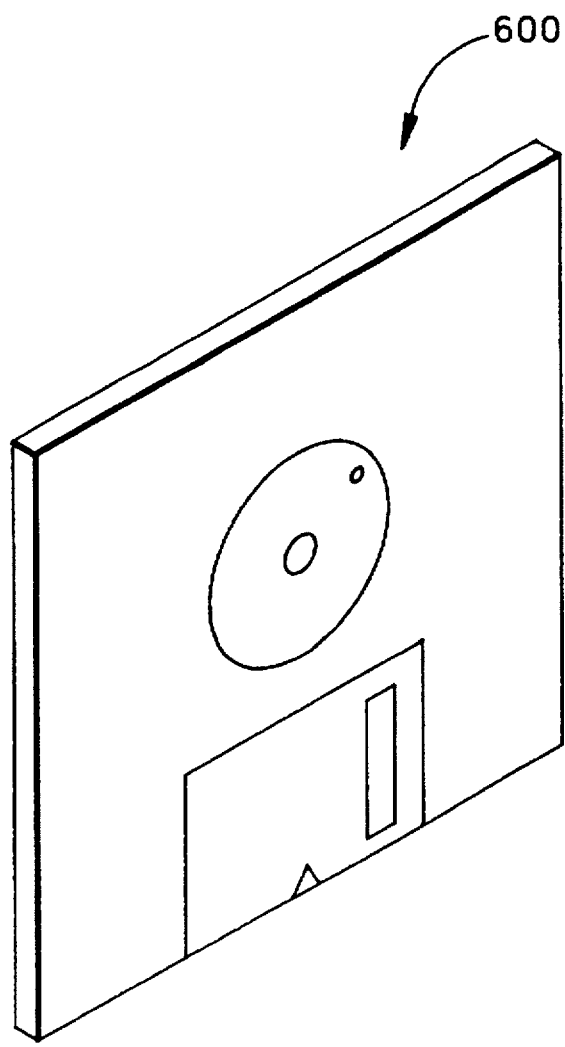
FIG. 6 is a diagram of a computer-readable diskette 600 for use in implementing one embodiment of image editor in accordance with the present invention.

The computer also includes an image editor 512. In one illustrative embodiment, the image editor 512 comprises a software product comprising a sequence of instructions that define functions that the image editor is to execute, along with workspace contents resident in the RAM of the computer 502, and one or more process control structures. In this embodiment, the image editor 512 may be implemented by a processor (not shown) that executes a series of computer-executable instructions that reside, for example, in RAM (not shown) of the computer 502, in the DASD 508, or in another suitable storage location of the computer 502. Alternatively, the instructions may be contained on a data storage medium, such as a computer-readable diskette 600 (FIG. 6), DASD array, magnetic tape, conventional "hard drive", electronic read-only memory, optical storage device, paper "punch" cards, or another data storage device. In an illustrative embodiment of the invention, the computer-executable instructions may comprise lines of compiled "Smalltalk" language code, or another language such as C.

Alternatively, the image editor 512 may comprise an application-specific integrated circuit ("ASIC") embodying customized logic and other resources that execute the functions of the image editor, as described below. In whatever form, the image editor 512 edits images by processing signals stored in the input image buffer 504, and transferring the processed signals to an output image buffer 514. Signals from the output image buffer 514 are conventionally fed to drivers 516 that produce, on signal lines 518, the red, green, and blue analog signals necessary to drive an output device 520. The output device 520, in an illustrative embodiment, comprises a video monitor such as a CRT monitor, LCD screen, or another suitable gamma-corrected RGB graphics monitor. The output device may instead comprise a color printer, color projector, or another suitable output apparatus.

An interactive interface to the image editor 512 is afforded by user-manipulated input devices such as a mouse 522 and keyboard 524 that are connected to the image editor 522 by a standard peripheral interface 526.

Figure 7:
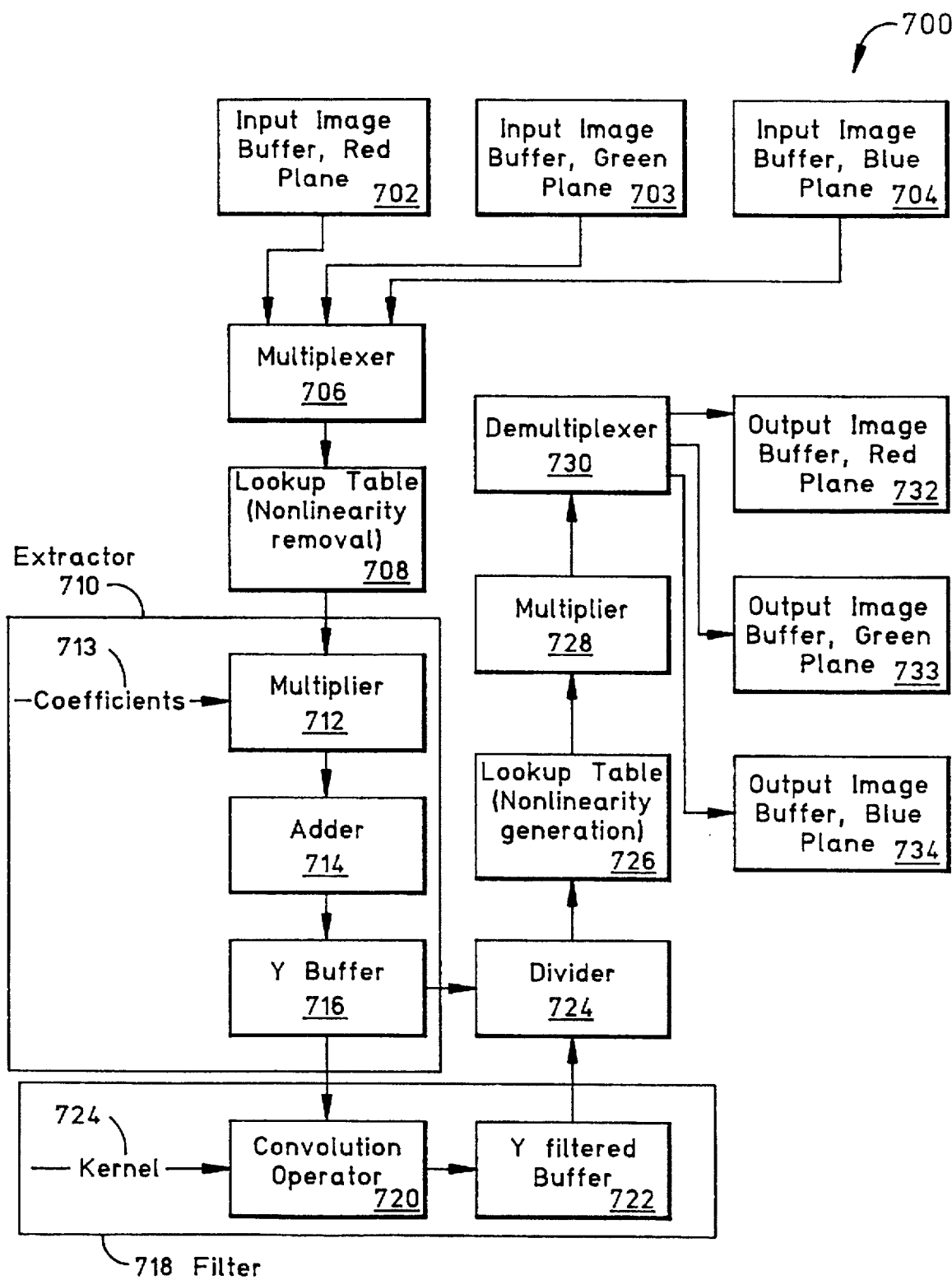
FIG. 7 is a diagram of the hardware components and interconnections of an illustrative image editor 512 in accordance with the present invention.

As described above, one embodiment of the image editor 512 may be implemented using an arrangement of circuit components, which may advantageously be embodied by an ASIC. This embodiment is illustrated in greater detail by the ASIC circuit 700 of FIG. 7. The circuit 700 includes input image buffers 702-704 to receive the red, green, and blue components of the pixels stored in the input image buffer 504. For each pixel stored in the buffer 504, the input image buffers 702-704 provide the corresponding red, blue, and green signals to a multiplexer 706. In response to a selector input (not shown), the multiplexer 706 selects a red, green, or blue signal from the input image buffers 702-704 and provides an output of the selected signal. In this way, the multiplexer 706 implements time-sharing of the circuitry 700, rather than requiring separate circuitry for processing signals from each color plane.

The multiplexer's output signal is directed to a lookup table 708, which creates a linearized signal by removing any nonlinearity present in the signal. In an illustrative embodiment, the lookup table 708 may comprise a table of pre-calculated conversions to translate from gamma-corrected input signals to signals without gamma correction. Where signals are represented by eight-bit numbers, the lookup table 708 may comprise, for example, a table that implements the relationship shown below in Equation 2.

$$OUT=255 \cdot [(IN/255)^\gamma] \quad [2]$$

where:

OUT represents a linear output signal between zero and 255;

IN represents the nonlinear input signal between zero and 255; and

γ represents gamma.

The lookup table 708 directs its signal to a luminance signal extractor 710, which comprises a multiplier 712, an adder, 714, and a buffer 716. The multiplier 712 first multiplies linearized signals corresponding to color components of a pixel by pre-prepared coefficients 713 to create product signals. Then, the adder 714 sums the product signals to yield a signal representing the luminance of the pixel originally received from the input image buffers 702-704.

Luminance signals from the buffer 716 are fed to a filter 718, which includes a convolution operator 720 and a buffer 722. For each luminance signal, the convolution operator 722 provides a filtered signal by convolving the luminance signal with luminance signals corresponding to certain other pixels in accordance with a pre-prepared filter kernel 724. The filtered signals are stored in the buffer 722.

Each filtered signal is directed to a divider 724, which divides the filtered signal by the original luminance signal, to provide a quotient signal. A second lookup table 726 then creates a nonlinear signal by non-linearizing the quotient signal. The nonlinear signal is preferably created based upon a complementary relationship to Equation 2 (above). Next, a multiplier 728 multiplies component signals of each original input pixel by the correction signal to yield sharpened output signals. A demultiplexer 730 directs each sharpened output signal to the output image buffer 732-734 corresponding to the appropriate red, green, or blue color plane, as appropriate.

In an alternative embodiment, the output image buffers 732-734 may be eliminated, and the input image buffers 702-704 used to serve a dual purpose. In another embodiment, the multiplexer 706 and demultiplexer 730 may be replaced with additional multipliers and lookup tables (not shown). Such modifications are readily understood by a skilled artisan having the benefit of this disclosure.

Operation

Another aspect of the present invention comprises a process, which may be performed -by the image editing system 500 described above. The process to be applied depends upon which color representation is desired for processing of the input image. The flow diagram of FIG. 8, for example illustrates a series of tasks performed upon luminance signals generated under the CIE Yxy scheme of representation. This scheme uses the well-known CIE chromaticity diagram having two dimensions (x and y) that define the chromaticity of a color and a third dimension, Y, that establishes brightness. Therefore, any color can be defined according to the CIE diagram by a triplet (Yxy). Each component of the triplet may be assigned a value on the CIE diagram and the values are combined to yield the color. According to the CIE scheme, reference may be made to the xy chromaticity of the pixel and to the Y luminance of the pixel.

In a general sense, the process 800 spatially filters the stored image to visually sharpen the features of the image. Item 802 represents the stored digital color input image, which has been received previously from a source such as the input device 506. The image is preferably stored in the buffer 504, although it may be stored in another location such as the DASD 508. The image is stored according to an RGB scheme, such that the stored signals comprise nonlinear representations. To process the image in accordance with the invention, task 803 first linearizes the pixels of the entire input image or a selected part, and provides the linearized signals for use by task 804. Task 804 extracts a luminance signal Y, in accordance with the CIE Yxy color scheme. Since different luminance signals are developed for each pixel of the input image, the luminance signal may be considered as an array of individual values. Luminance signals may be extracted in task 804 for all pixels of the input image. Alternatively, task 804 may extract luminance signals for a selected portion of the input image.

Each luminance signal is generated based upon the stored red, green, and blue pixel component signals. This may be achieved using one of several different approaches, depending upon the type of RGB representation used to store the pixel signals in the input image buffer 504. For SMPTE-C type RGB, each luminance signal may be developed using the approximation of Equation 3 (below):

$$Y=0.2123R+0.701G+0.0865B \quad [3]$$

where:

Y represents a linear luminance signal corresponding to the input pixel; and

R, G, and B represent linearized signals corresponding to the red, blue, and green components of the input pixel.

Other approaches may be used instead to extract the luminance signal. If the input image is stored according to the CCIR 709 RGB standard, the luminance signal is developed according to Equation 4 (below):

$$Y=0.2126R+0.752+0.0722B \quad [4]$$

After task 804 extracts the luminance signal, task 805 filters it. In an illustrative embodiment, this may be accomplished by performing convolution in task 806 with a kernel previously constructed in task 808. The kernel comprises an array of coefficients, which are used to selectively weight the luminance signal by luminance signals corresponding to other selected pixels, such as certain neighboring pixels, of the image. In an illustrative embodiment, the kernel comprises an array of values that may range from negative one to two or three. Construction of an appropriate kernel is within the abilities of an ordinarily skilled artisan having the benefit of this disclosure. However, an exemplary kernel is shown below in Table 2.

TABLE 2

| -1/8 | -1/8 | -1/8 |
|------|------|------|
| -1/8 | +2   | -1/8 |
| -1/8 | -1/8 | -1/8 |

Alternatively, the filtering may be accomplished by adjusting luminance signals after correcting them to a frequency-based domain using a method such as "transform domain processing", the "Hadamard" method, or another suitable technique. For example, Fourier transforms may be employed to aid in the filtering of task 805. If Fourier transforms are used, the image is processed by: (1) using Fourier transform to convert the luminance signals extracted from the input image into a frequency-based domain, (2) filtering the converted image by applying certain mathematical operations to the image, and (3) applying inverse Fourier transform to convert the filtered image back to the original domain. In this embodiment, the filtering may be accomplished by simply by changing the high frequency pixel components to zero, or by scaling them, for example. Task 805 may be performed by a number of other techniques, as well, such as known methods of morphological filtering. As known in the relevant art, morphological filtering modifies a graphic image using skeletonization, dilation, and erosion. See, e.g., Pratt, "Digital Image Processing", 2nd edition, 1991.

After task 805 produces filtered luminance signals, task 810 normalizes each signal by dividing it by the original luminance signal corresponding to the same pixel, thereby yielding a quotient signal. Then, task 811 applies gamma correction to the quotient signal, yielding a corrected quotient signal. The corrected quotient signal indicates the amount, if any, by which the luminance of each pixel in the image must be increased or decreased. Accordingly, task 812 multiplies each corrected quotient signal by the components of the corresponding input pixel to create a new image, whose luminance varies as that of the filtered luminance signal.

Figure 8:
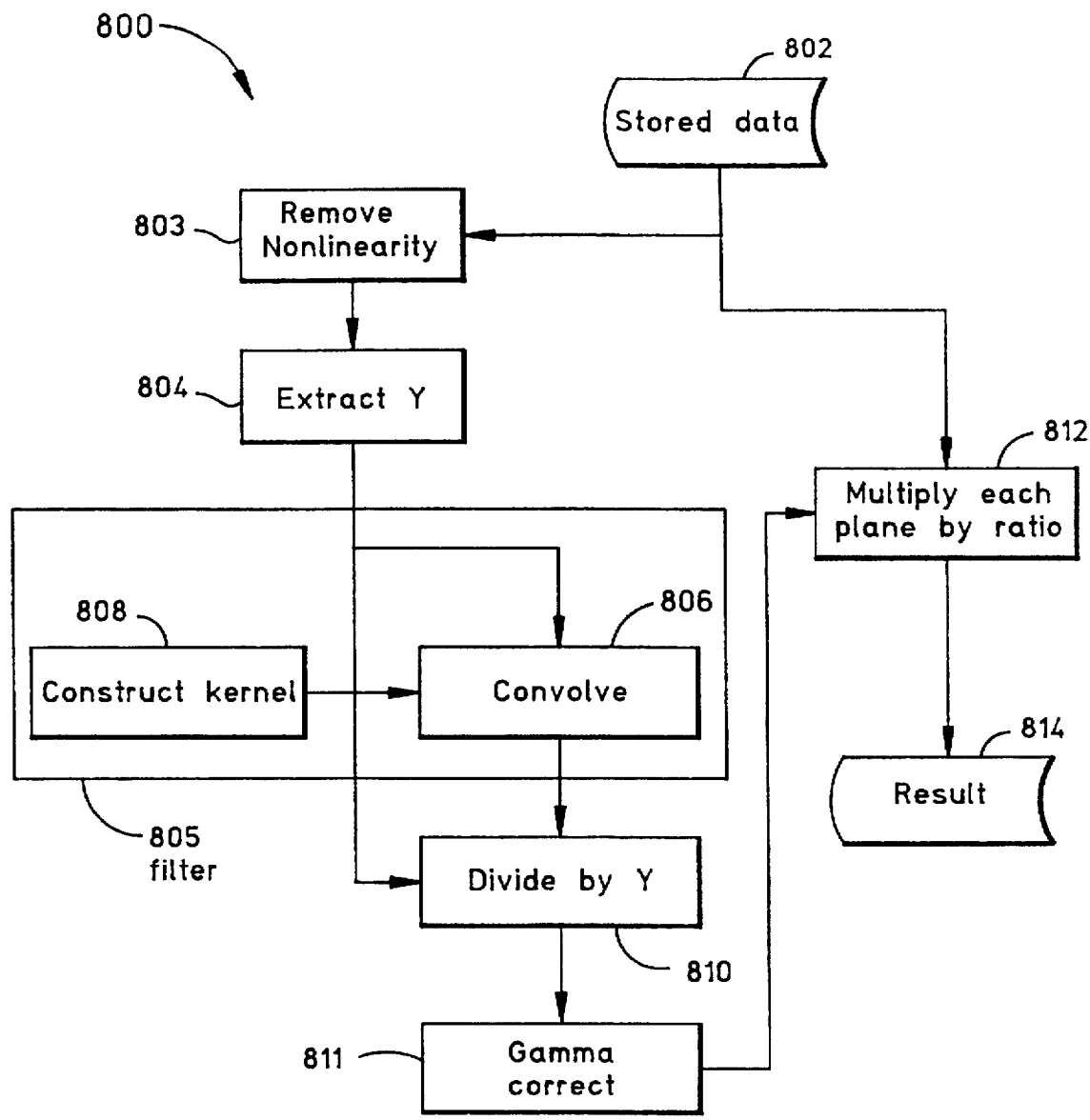
FIGS. 8–9 are flow diagrams illustrating various illustrative embodiments of the process of the present invention.

In addition to the flow diagram 800 of FIG. 8, the invention may also be illustrated by a sequence of pseudo code. Two alternate embodiments of such pseudo code sequences are shown below in Tables 3 and 4.

TABLE 3 approach of this invention
input image planes are r, g, and b
scale each plane into the range 0 . . . 1
rScaled = r/255.0
gScaled = g/255.0
bScaled = b/255.0
remove the non-linearity
rLinear = rScaled ^ gamma
gLinear = gScaled ^ gamma
bLinear = bScaled ^ gamma
calculate Y
coefficients shown are for SMPTE-C primaries, white point = D65
Y = 0.2124 * rLinear + 0.7011 * gLinear + 0.0865 * bLinear
filter Y
YFiltered = convolve Y kernel
compute ratio, gamma correct
YRatio = YFiltered/Y
YRatioCorrected = Yfiltered ^ (1.0/gamma)
scale image planes
rFiltered = r * YRatioCorrected
gFiltered = g * YRatioCorrected
bFiltered = b * YRatioCorrected
convert back to 8 bits per color plane
(multiplication by floating point image forced conversion)
rFiltered = c1 rFiltered
gFiltered = c1 gFiltered
bFiltered = c1 bFiltered

TABLE 4 approach of this invention
input image planes are r, g, and b
scale each plane into the range 0 . . . 1
remove the non-linearity
rLinear = lookup r gammaTable
gLinear = lookup g gammaTable
bLinear = lookup b gammaTable
calculate Y
coefficients shown are for SMPTE-C primaries, white point = D65
Y = 0.2124 * rLinear + 0.7011 * gLinear + 0.0865 * bLinear
filter Y
YFiltered = convolve Y kernel
compute ratio, gamma correct
YRatio = YFiltered/Y
Yratio = c1 YRatio
YRatioCorrected = lookup YRatio inverseGammaTable
scale image planes
rFiltered = r * YRatioCorrected
gFiltered = g * YRatioCorrected
bFiltered = b * YRatioCorrected Testing An exemplary embodiment of the present invention was constructed to test the operation of the present invention. To perform the test, the hardware arrangement of FIG. 5 was implemented using an IBM brand RS/6000 model computer. The flow diagram of FIG. 8 was implemented using the "IBM Image Assistant" software package. Specifically, programming instructions were written in "script" form, then executed to carry out the tasks of FIG. 8. The input image was stored under the SMPTE-C RGB format, and luminance was generated using the CIE Yxy color space, as discussed above in conjunction with FIG. 8. This test employed a kernel of seven rows and seven columns, as shown below in Table 5 (below):

TABLE 5

| -1/48 | -1/48 | -1/48 | -1/48 | -1/48 | -1/48 | -1/48 |
|-------|-------|-------|-------|-------|-------|-------|
| -1/48 | -1/48 | -1/48 | -1/48 | -1/48 | -1/48 | -1/48 |
| -1/48 | -1/48 | -1/48 | -1/48 | -1/48 | -1/48 | -1/48 |
| -1/48 | -1/48 | -1/48 | +2    | -1/48 | -1/48 | -1/48 |
| -1/48 | -1/48 | -1/48 | -1/48 | -1/48 | -1/48 | -1/48 |
| -1/48 | -1/48 | -1/48 | -1/48 | -1/48 | -1/48 | -1/48 |
| -1/48 | -1/48 | -1/48 | -1/48 | -1/48 | -1/48 | -1/48 |

The number of add, multiply, and divide operations needed to process an input image were counted, each operation being performed on an eight bit integer, and the results were normalized to represent the operations required for processing one pixel. Table 6 (below) illustrates the results of this test.

TABLE 6

| OPERATION | ADDS | MULTIPLIES | DIVIDES |
|-----------|------|------------|---------|
| Compute Y (task 804) | 2 | 3 | 0 |
| Filter (task 805) | 48 | 49 | 0 |
| Compute ratio (task 810) | 0 | 0 | 1 |
| Multiply by ratio (task 812) | 0 | 3 | |
| Total | 50 | 55 | 1 |

Figure 2:
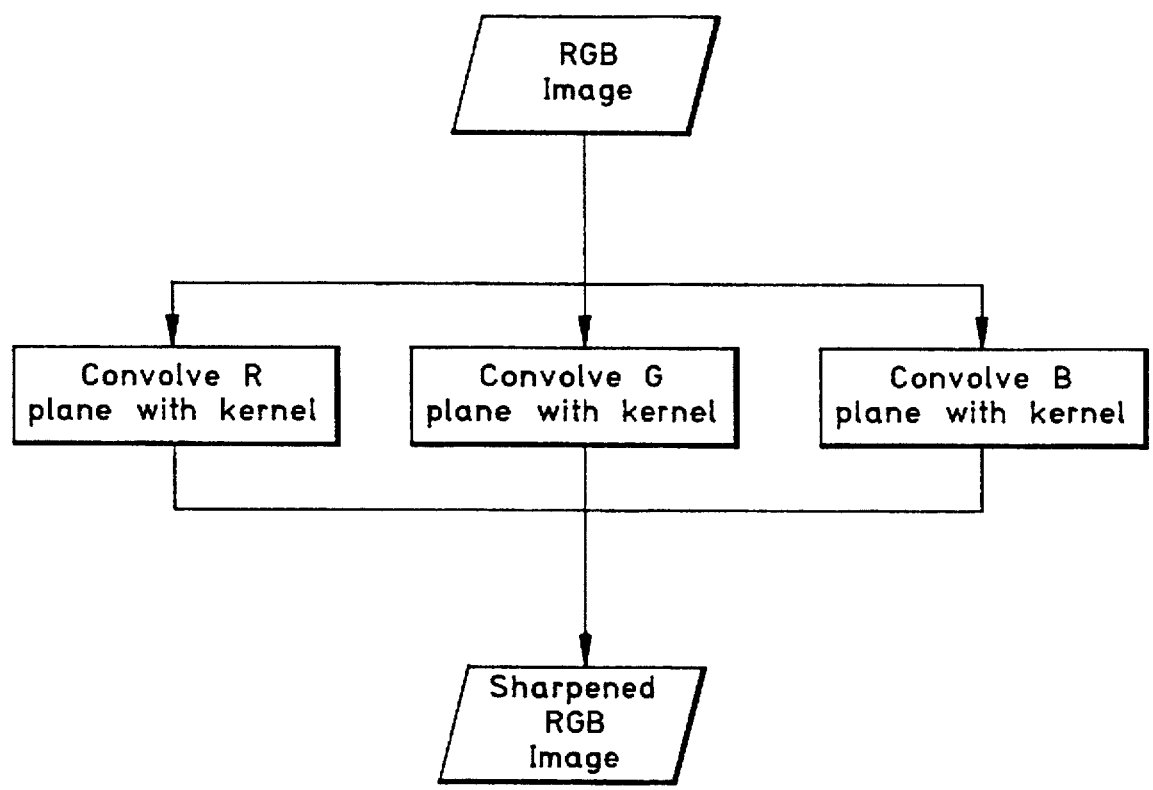
FIG. 2 is a flow diagram of a known spatial filtering process that processes each color plane separately.

For comparison, a conventional image editor was constructed using the hardware and software mentioned above, and each plane was processed separately according to the flow diagram of FIG. 2. Table 7 (below) illustrates the computational cost of this method, per pixel of the input image.

TABLE 7

| OPERATION | ADDS | MULTIPLIES | DIVIDES |
|-----------|------|------------|---------|
| Filter | 144 | 147 | 0 |
| Total | 144 | 147 | 0 |

Figure 3:
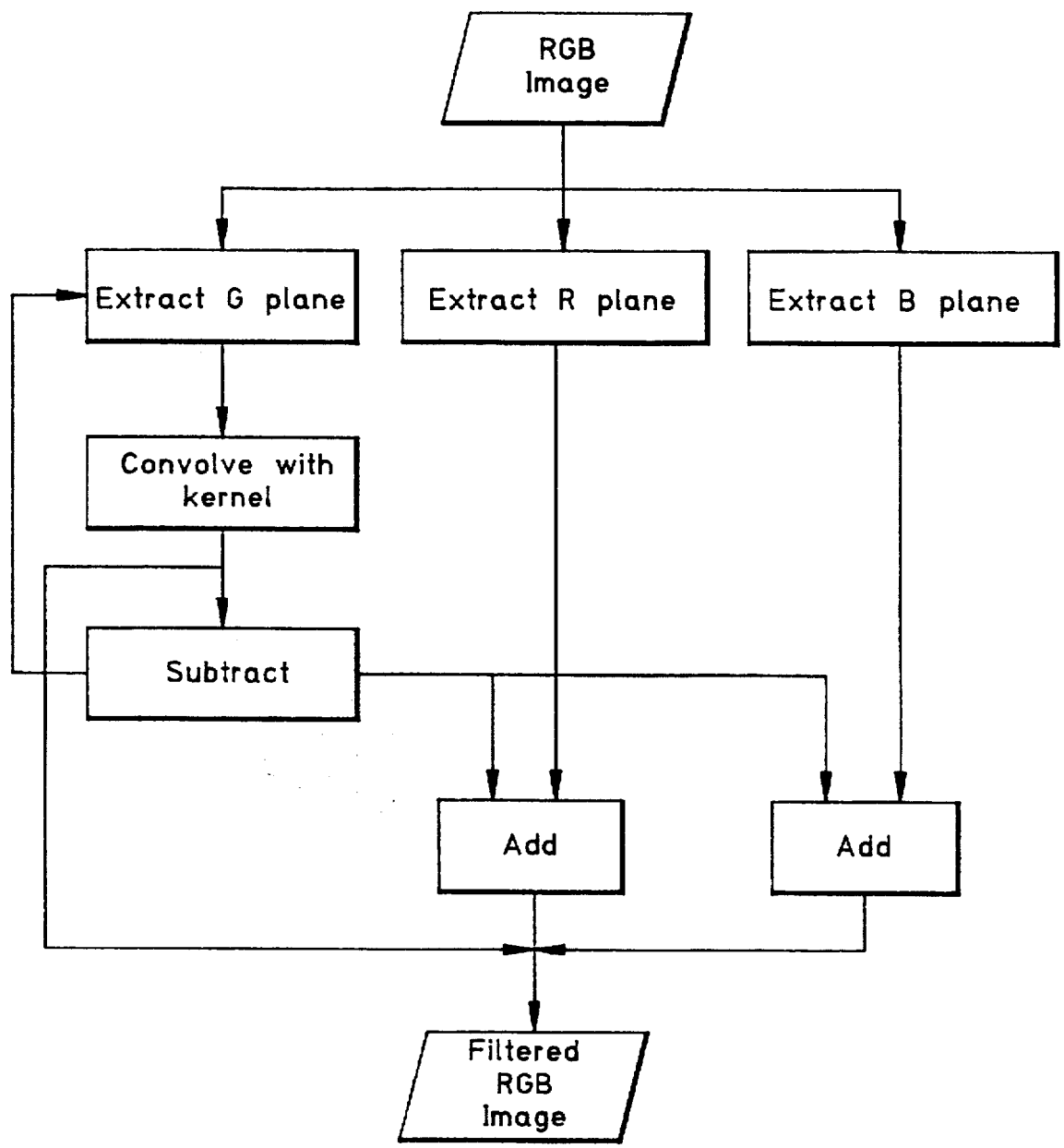
FIG. 3 is a flow diagram of a known spatial filtering process that filters one color plane and processes the remaining color planes by adding the corrections obtained from the first plane.
Figure 4:
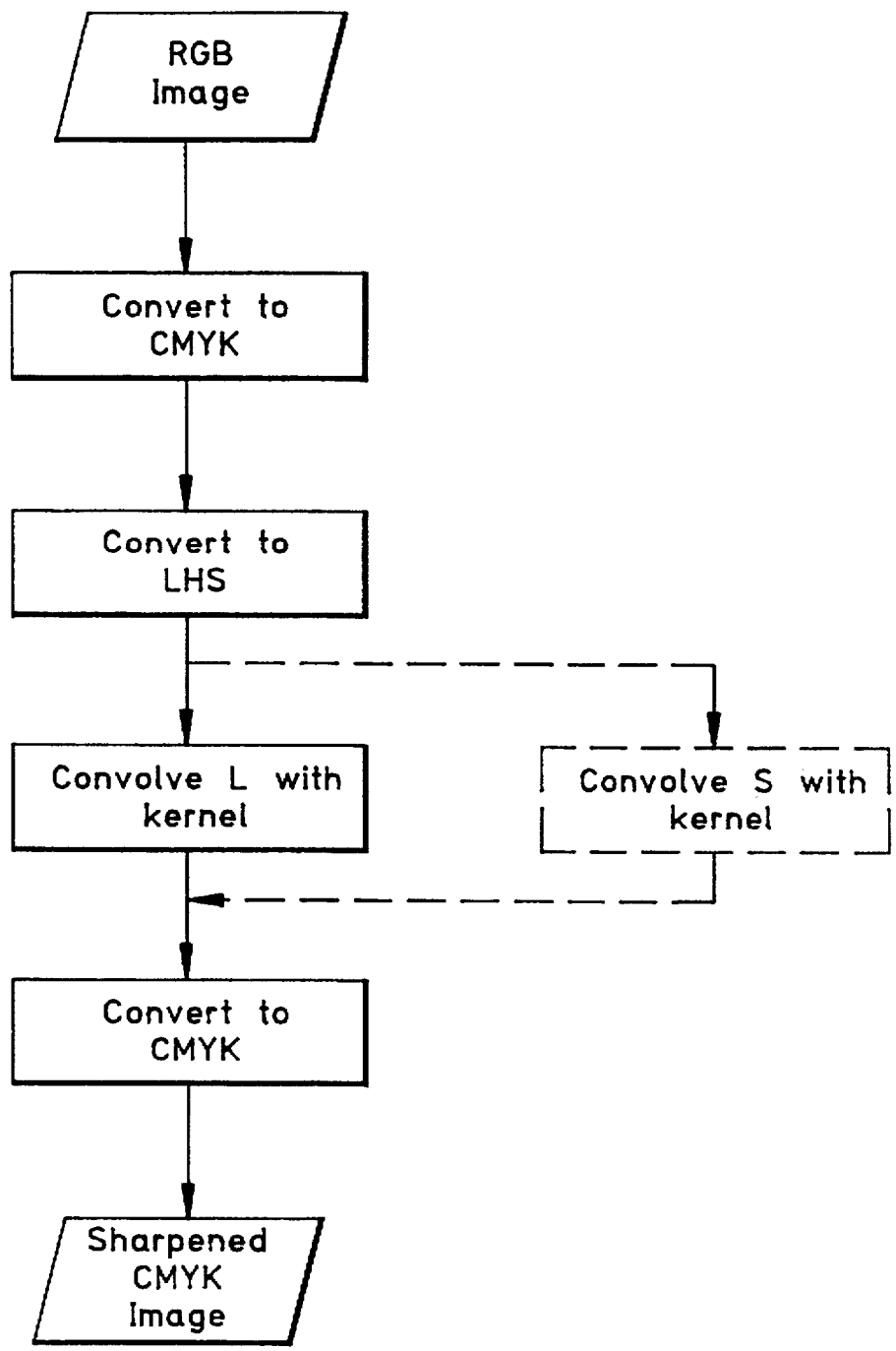
FIG. 4 is a flow diagram of a known spatial filtering process that operates in the luminance-chrominance color space.

As shown above by Tables 6–7, the tested embodiment of the present invention required 135 less operations than the conventional approach. This precise difference in computational efficiency, however, would be expected to vary from FIGS. 2–3 depending upon the particular filtering technique that is used. Smaller kernels, for example, may yield a smaller difference in efficiency, whereas larger kernels may result in a larger difference.

Advantages

The invention affords its users with a number of distinct advantages. Chiefly, the invention provides an image editor that implements a spatial filter that is significantly less computation-intensive than known arrangements. As a result, the invention operates with increased speed and efficiency, freeing computer resources to perform other functions.

Moreover, the invention provides more accurate results than many prior arrangements having the same speed. An image sharpened in accordance with the invention, for example, carries hue angles that closely correspond to those of the original image. In particular, when an image is processed in accordance with the present invention, the chroma of the image increases where the filtered image is brightened, and decreases where the filtered image is darkened, as would occur if light falling on the object represented by the image were increased or decreased. As a result, the processed image provides a natural and visually-pleasing effect.

Another advantage of the invention is that it does not change the proportion of red, green, and blue coloring for each pixel, since the three color planes are all multiplied by the same amount for each pixel. This is true even if the pixels in the input image are stored in gamma-corrected RGB format. This occurs because multiplying a linear representation by an original constant and then gamma-correcting the product produces the same results as multiplying a gamma-corrected representation by a different constant, as shown below in Equations 5–7:

$$k^{\gamma}R' = k^{\gamma}R'^{\gamma} = (kR)^{\gamma} \qquad [5]$$

$$k^{\gamma}G' = k^{\gamma}G'^{\gamma} = (kG)^{\gamma} \qquad [6]$$

$$k^{\gamma}B' = k^{\gamma}B'^{\gamma} = (kB)^{\gamma} \qquad [7]$$

where:

k is the original constant;

$k^{\gamma}$ is the different constant; and

R', G', and B' represent values of red, green, and blue for a pixel.

Some Exemplary Alternatives

While there have been shown what are presently considered to be preferred embodiments of the invention, it will be apparent to those skilled in the art that various changes and modifications can be made herein without departing from the scope of the invention as defined by the appended claims.

Figure 9:
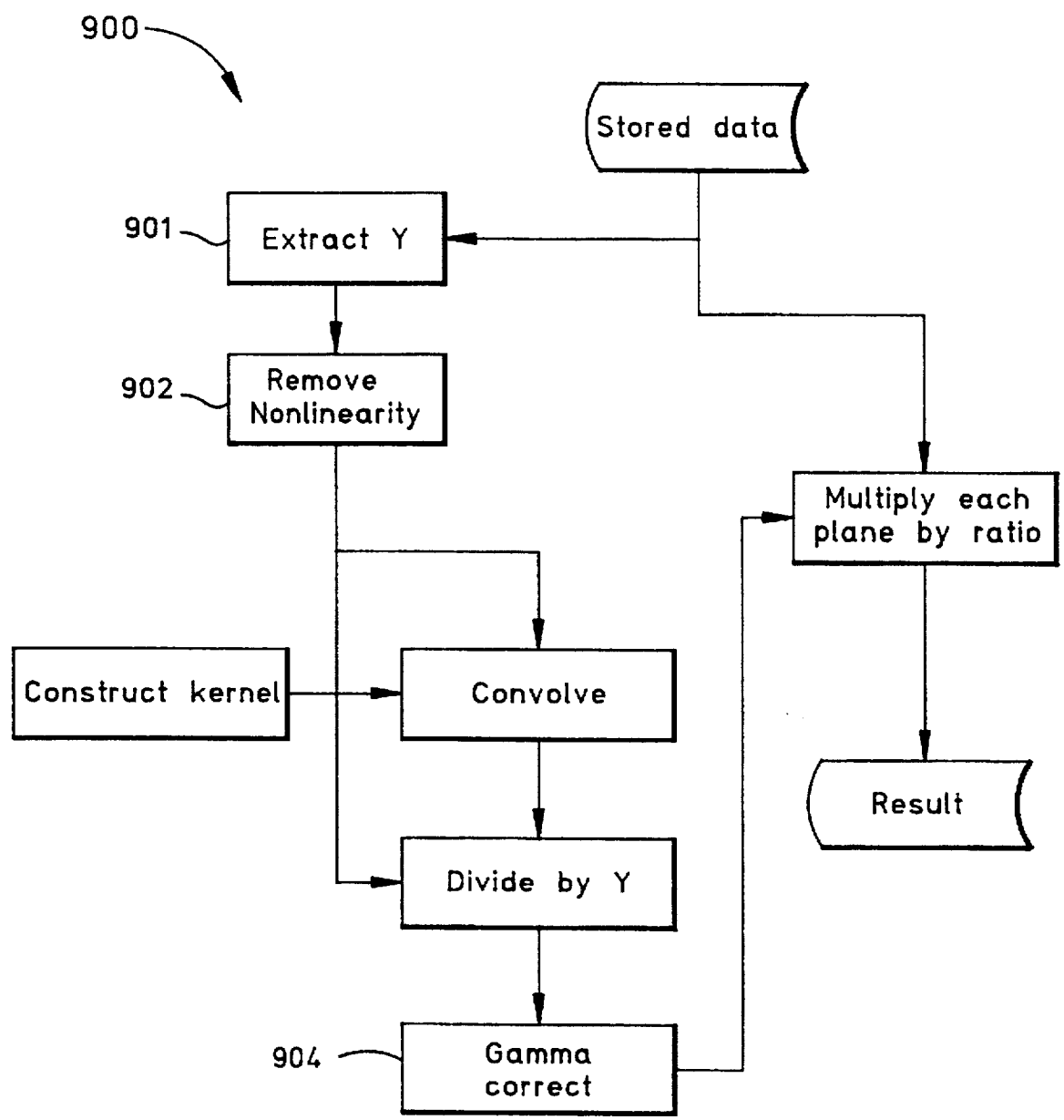

For example, other luminance signals may be extracted, in contrast to computation of CIE Yxy described above. For example, luminance may be measured in accordance with the CIELAB, CIELUV, CIEXYZ, $YC_rC_b$, the YIQ, or another appropriate standard. Another useful approximation of luminance is the value Y' defined by the well-known NTSC standard. FIG. 9 shows a flow diagram 900 that employs the NTSC representation scheme for luminance. This diagram 900 is similar to the flow diagram 800 for CIE Yxy in many respects. However, luminance (Y') is extracted in task 901 without requiring any linearizing of the signals of the stored input image. Luminance may be extracted, in an illustrative embodiment, according to the approximations of Equations 8–12, below.

$$Y' = 0.2999R' + 0.587G' + 0.114B' \qquad [8]$$

$$Y' = 0.3R' + 0.59G' + 0.11B' \qquad [9]$$

$$Y' = 0.25R' + 0.625G' + 0.125G' + 0.125B' \qquad [10]$$

$$Y' = 0.25R' + 0.5G' + 0.125G' + 0.125B' \qquad [11]$$

$$Y' = 0.25R' + 0.75G' = 0.25R' + 0.25G' + 0.5G' \qquad [12]$$

where:

Y' represents gamma-corrected luminance; and

R', G', and B' represent gamma-corrected value of red, green, and blue, respectively.

If desired, the extracted luminance signals may be processed in task 902 to remove their nonlinearities prior to filtering. However, this step is optional, and omission of task 902 may yield acceptable results for some applications, with little or no degradation in performance. If task 902 is performed, the flow diagram 900 also includes task 904, which performs gamma-correction to introduce the nonlinearities removed in task 902.

Those skilled in the art, however, will appreciate that NTSC luminance Y' is not the CIE Yxy luminance "Y" discussed above. Some other luminance approximations are described in U.S. Patent application Ser. No. 08/329,040, which was filed on Oct. 25, 1994 now abandoned in the name of the present inventor, and is hereby incorporated herein by reference in its entirety.

What is claimed is:

1. A method of modifying colors of pixels in a digital color input image, comprising the steps of:

receiving a digital color input image, where said input image includes multiple input pixels, each pixel including red, blue, and green components;

developing luminance signals, each representing the luminance of a corresponding pixel of a selected group of the input pixels;

processing the selected group of pixels by performing steps comprising:

spatially filtering the luminance signals to provide filtered luminance signals corresponding thereto;

generating quotient signals representing the filtered luminance signals divided by their corresponding luminance signals; and multiplying the components of the selected group of input pixels by corresponding quotient signals to create output signals; and directing the output signals to an output device to display an output image corresponding to the output signals.

2. The method of claim 1, wherein the selected group of pixels comprises all pixels of the image.

3. The method of claim 1, wherein the spatially filtering step comprises the steps of:

providing modified luminance signals by converting the luminance signals from an original domain to a frequency-based domain;

providing filtered luminance signals by reducing modified luminance signals having frequencies greater than a selected level; and converting the filtered luminance signals from the frequency-based domain to the original domain.

4. The method of claim 3, wherein the frequency-based domain comprises the Fourier domain.

5. The method of claim 1, wherein the processing step comprises the steps of:

selecting a pixel;

spatially filtering a luminance signal corresponding to the selected pixel to provide a filtered signal corresponding thereto;

generating a quotient signal representing the filtered signal divided by its corresponding luminance signal;

multiplying the components of the selected pixel by the quotient signal to create an output signal; and repeating the selecting, generating, and multiplying steps for remaining pixels of the selected group.

6. The method of claim 1, wherein the processing step comprises the steps of:

spatially filtering each of the luminance signals to provide a set of filtered luminance signals corresponding to the selected group of pixels;

generating a set of quotient signals corresponding to the selected group of pixels each quotient signal representing a filtered signal divided by its corresponding luminance signal; and multiplying the components of each pixel in the selected group of pixels by the corresponding quotient signal to create a set of output signals.

7. The method of claim 5, wherein the spatial filtering step comprises the steps of convolving the luminance signal corresponding to the selected pixel with luminance signals corresponding to predetermined pixels of the selected group in accordance with a pre-prepared filtered kernel.

8. The method of claim 6, wherein the spatially filtering step comprises the steps of convolving each of the luminance signals with luminance signals corresponding to predetermined pixels of the selected group in accordance with a pre-prepared filter kernel.

9. The method of claim 7, further comprising the steps of preparing the filter kernel.

10. The method of claim 8, further comprising the steps of preparing the filter kernel.

11. The method of claim 1, wherein the red, green, and blue components of the pixels of the input image are represented in CCIR 709 RGB format.

12. The method of claim 1, wherein the red, green, and blue components of the pixels of the input image are represented in SMPTE-C RGB format.

13. The method of claim 1, wherein the developing step comprises the steps of:

removing nonlinearity from the red, green, and blue pixel components of the input image to provide linearized red, green, and blue components; and providing a luminance signal by combining the linearized red, green, and blue components in predetermined proportions.

14. The method of claim 1, wherein the developing step comprises the steps of providing a luminance signal in accordance with a color space compatible with CIE Yxy.

15. The method of claim 14, wherein the providing step comprises the steps of:

removing nonlinearity from the red, green, and blue pixel components of the input image to provide a linearized red component R, linearized green component G, and linearized blue component B; and providing a luminance signal Y as follows:

$Y=0.2123R+0.7011G+0.0865B.$

16. The method of claim 14, wherein the providing step comprises the steps of:

removing nonlinearity from the red, green, and blue pixel components of the input image to provide a linearized red component R, linearized green component G, and linearized blue component B; and providing a luminance signal Y as follows:

$Y=0.2126R+0.752G+0.0722B.$

17. The method of claim 1, wherein the developing step comprises the steps of providing a luminance signal in accordance with a color space compatible with NTSC Y by combining the red, green, and blue pixel components in predetermined proportions.

18. The method of claim 1, wherein the developing step comprises the steps of providing a luminance signal in accordance with a color space compatible with NTSC Y.

19. The method of claim 18, wherein the providing step comprises the steps of providing a luminance signal Y' in relation to the red pixel component R', green pixel component G', and blue color component B', as follows:

$$Y'=0.2999R'+0.587G'+0.114B'.$$

20. The method of claim 18, wherein the providing step comprises the steps of providing a luminance signal Y' in relation to the red pixel component R', green pixel component G', and blue color component B', as follows:

$$Y'=0.3R'+0.59G'+0.11B'.$$

21. The method of claim 18, wherein the providing step comprises the steps of providing a luminance signal Y' in relation to the red pixel component R', green pixel component G', and blue color component B', as follows:

$$Y'=0.25R'+0.625G'+0.125B'.$$

22. The method of claim 18, wherein the providing step comprises the steps of providing a luminance signal Y' in relation to the red pixel component R', green pixel component G', and blue color component B', as follows:

$$Y'=0.25R'+0.75G'.$$

23. The method of claim 1, wherein the generating step additionally comprises the step of applying gamma correction to the quotient signal.

24. The method of claim 1, the red, blue, and green components of the input image being nonlinear signals, wherein each luminance signal represents linearized luminance of a corresponding pixel of a selected group of the input pixels.

25. An image editing apparatus for modifying colors of pixels of a digital color input image contained in a source of a digital color input image, where said input image includes multiple input pixels, each pixel including red, blue, and green components, said image editor comprising:

an extractor electrically connected to the source to develop luminance signals each representing the luminance of a corresponding pixel of a selected group of the input pixels;

a spatial filter electrically connected to the extractor to spatially filter the luminance signals to provide filtered luminance signals corresponding thereto;

a divider electrically connected to the filter to generate quotient signals representing the filtered luminance signals divided by their corresponding luminance signals; and a multiplier electrically connected to the divider to multiply the components of the selected group of input pixels by corresponding quotient signals to create output signals.

26. The apparatus of claim 25, wherein the selected group of pixels comprises all pixels of the image.

27. The apparatus of claim 25, wherein the spatial filter comprises: means for providing modified luminance signals by converting the luminance signals from an original domain to a frequency-based domain;

means for providing filtered luminance signals by reducing modified luminance signals having frequencies greater than a selected level; and means for converting the filtered luminance signals from the frequency-based domain to the original domain.

28. The apparatus of claim 27, wherein the frequency-based domain comprises the Fourier domain.

29. The apparatus of claim 25, wherein the spatial filter comprises means for convolving each luminance signal with luminance signals corresponding to predetermined pixels of the selected group in accordance with a pre-prepared filtered kernel.

30. The apparatus of claim 25, wherein the red, green, and blue components of the pixels of the input image are represented in CCIR 709 RGB format.

31. The apparatus of claim 25, wherein the red, green, and blue components of the pixels of the input image are represented in SMPTE-C RGB format.

32. The apparatus of claim 25, wherein the extractor comprises: means for removing nonlinearity from the red, green, and blue pixel components of the input image to provide linearized red, green, and blue components; and means for providing a luminance signal by combining the linearized red, green, and blue components in predetermined proportions.

33. The apparatus of claim 25, wherein the extractor comprises a means for providing a luminance signal in accordance with a color space compatible with CIE Yxy.

34. The apparatus of claim 33, wherein the extractor comprises:

means for removing nonlinearity from the red, green, and blue pixel components of the input image to provide a linearized red component R, linearized green component G, and linearized blue component B; and means for providing a luminance signal Y as follows:

$$Y=0.2123R+0.7011G+0.0865B.$$

35. The apparatus of claim 33, wherein the extractor comprises:

means for removing nonlinearity from the red, green, and blue pixel components of the input image to provide a linearized red component R, linearized green component G, and linearized blue component B; and means for providing a luminance signal Y as follows:

$$Y=0.2126R+0.752G+0.0722B.$$

36. The apparatus of claim 25, wherein the extractor comprises means for providing a luminance signal in accordance with a color space compatible with NTSC Y by combining the red, green, and blue pixel components in predetermined proportions.

37. The apparatus of claim 25, wherein the extractor comprises means for providing a luminance signal in accordance with a color space compatible with NTSC Y.

38. The apparatus of claim 37, wherein the extractor comprises means for providing a luminance signal Y' in relation to the red pixel component R', green pixel component G', and blue color component B', as follows:

$$Y'=0.2999R'+0.587G'+0.114B'.$$

39. The apparatus of claim 37, wherein the extractor comprises means for providing a luminance signal Y' in relation to the red pixel component R', green pixel component G', and blue color component B', as follows:

$$Y'=0.3R'+0.59G'+0.11B'.$$

40. The apparatus of claim 37, wherein the extractor comprises means for providing a luminance signal Y' in relation to the red pixel component R', green pixel component G', and blue color component B', as follows:

$$Y'=0.25R'+0.625G'+0.125B'.$$

41. The apparatus of claim 37, wherein the extractor comprises means for providing a luminance signal Y' in relation to the red pixel component R', green pixel component G', and blue color component B', as follows:

$$Y'=0.25R'+0.75G'.$$

42. The apparatus of claim 25, wherein the divider additionally comprises means for applying gamma correction to the quotient signal.

43. The apparatus of claim 25, the red, blue, and green components of the input image being nonlinear signals, wherein each luminance signal represents linearized luminance of a corresponding pixel of a selected group of the input pixels.

44. A program storage device readable by a digital processing apparatus and tangibly embodying a program of instructions executable by the digital processing apparatus to perform method steps for modifying colors of pixels of a digital color input image, said method steps comprising:
  receiving a digital color input image, where said input image includes multiple input pixels, each pixel including red, blue, and green components;
  developing luminance signals, each representing the luminance of a corresponding pixel of a selected group of the input pixels;
  processing the selected group of pixels by performing steps comprising:
    spatially filtering the luminance signals to provide filtered luminance signals corresponding thereto;
    generating quotient signals representing the filtered luminance signals divided by their corresponding luminance signals; and
    multiplying the components of the selected group of input pixels by corresponding quotient signals to create output signals; and
  directing the output signals to an output device to display an output image corresponding to the output signals.

45. The device of claim 44, wherein the selected group of pixels comprises all pixels of the image.

46. The device of claim 45, wherein the spatially filtering step comprises the steps of:
  providing modified luminance signals by converting the luminance signals from an original domain to a frequency-based domain;
  providing filtered luminance signals by reducing modified luminance signals having frequencies greater than a selected level; and
  converting the filtered luminance signals from the frequency-based domain to the original domain.

47. The device of claim 46, wherein the frequency-based domain comprises the Fourier domain.

48. The device of claim 44, wherein the processing step comprises the steps of:
  selecting a pixel;
  spatially filtering a luminance signal corresponding to the selected pixel to provide filtered signal corresponding thereto;
  generating a quotient signal representing the filtered signal divided by its corresponding luminance signal;
  multiplying the components of the selected pixel by the quotient signal to create an output signal; and
  repeating the selecting, generating, and multiplying steps for remaining pixels of the selected group.

49. The device of claim 44, wherein the processing step comprises the steps of:
  spatially filtering each of the luminance signals to provide a set of filtered luminance signals corresponding to the selected group of pixels;
  generating a set of quotient signals corresponding to the selected group of pixels each quotient signal representing a filtered signal divided by its corresponding luminance signal; and
  multiplying the components of each pixel in the selected group of pixels by the corresponding quotient signal to create a set of output signals.

50. The device of claim 48, wherein the spatial filtering step comprises the steps of convolving the luminance signal corresponding to the selected pixel with luminance signals corresponding to predetermined pixels of the selected group in accordance with a pre-prepared filtered kernel.

51. The device of claim 49, wherein the spatially filtering step comprises the steps of convolving each of the luminance signals with luminance signals corresponding to predetermined pixels of the selected group pixels in accordance with a pre-prepared filter kernel.

52. The device of claim 50, further comprising the steps of preparing the filter kernel.

53. The device of claim 51, further comprising the steps of preparing the filter kernel.

54. The device of claim 44, wherein the red, green, and blue components of the pixels of the input image are represented in CCIR 709 RGB format.

55. The device of claim 44, wherein the red, green, and blue components of the pixels of the input image are represented in SMPTE-C RGB format.

56. The device of claim 44, wherein the developing step comprises the steps of:
  removing nonlinearity from the red, green, and blue pixel components of the input image to provide linearized red, green, and blue components; and
  providing a luminance signal by combining the linearized red, green, and blue components in predetermined proportions.

57. The device of claim 44, wherein the developing step comprises the steps of providing a luminance signal in accordance with a color space compatible with CIE Yxy.

58. The device of claim 57, wherein the providing step comprises the steps of:
  removing nonlinearity from the red, green, and blue pixel components of the input image to provide a linearized red component R, linearized green component G, and linearized blue component B; and
  providing a luminance signal Y as follows:

$$Y=0.2123R+0.7011G+0.0865B.$$

59. The device of claim 57, wherein the providing step comprises the steps of:
  removing nonlinearity from the red, green, and blue pixel components of the input image to provide a linearized red component R, linearized green component G, and linearized blue component B; and
  providing a luminance signal Y as follows:

$$Y=0.2126R+0.752G+0.0722B.$$

60. The device of claim 44, wherein the developing step comprises the steps of providing a luminance signal in accordance with a color space compatible with NTSC Y by combining the red, green, and blue pixel components in predetermined proportions.

61. The device of claim 44, wherein the developing step comprises the steps of providing a luminance signal in accordance with a color space compatible with NTSC Y.

62. The device of claim 61, wherein the providing step comprises the steps of providing a luminance signal Y' in relation to the red pixel component R', green pixel component G', and blue color component B', as follows:

$$Y'=0.2999R'+0.587G'+0.114B'.$$

63. The device of claim 61, wherein the providing step comprises the steps of providing a luminance signal Y' in relation to the red pixel component R', green pixel component G', and blue color component B', as follows:

$$Y'=0.3R'+0.59G'+0.11B'.$$

64. The device of claim 61, wherein the providing step comprises the steps of providing a luminance signal Y' in relation to the red pixel component R', green pixel component G', and blue color component B', as follows:

$$Y'=0.25R'+0.625G'+0.125B'.$$

65. The device of claim 61, wherein the providing step comprises the steps of providing a luminance signal Y' in relation to the red pixel component R', green pixel component G', and blue color component B', as follows:

$$Y'=0.25R'+0.75G'.$$

66. The device of claim 44, wherein the generating step additionally comprises the step of applying gamma correction to the quotient signal.

67. The device of claim 44, the red, blue, and green components of the input image being nonlinear signals, wherein each luminance signal represents linearized luminance of a corresponding pixel of a selected group of the input pixels.

68. The device of claim 44, wherein the device comprises a portable diskette readable by a diskette drive of the digital processing apparatus.

69. The device of claim 44, wherein the device comprises a direct access storage device.

70. The method of claim 1, the selected group of pixels being a portion of pixels of the image less than all pixels of the image.

71. The apparatus of claim 25, the selected group of pixels being a portion of pixels of the image less than all pixels of the image.

72. The program storage device of claim 44, the selected group of pixels being a portion of pixels of the image less than all pixels of the image.

* * * * *